United States Patent [19]
Fuss et al.

[11] Patent Number: 5,563,672
[45] Date of Patent: Oct. 8, 1996

[54] INTERLOCK MECHANISM FOR PREVENTING DEPLOYMENT OF FILM LOADING CHAMBER OF A CAMERA

[75] Inventors: Timothy J. Fuss; Leonard Richiuso, both of Rochester; Donald P. McGinn, Palmyra, all of N.Y.

[73] Assignee: Eastman Kodak Company, Rochester, N.Y.

[21] Appl. No.: 334,503

[22] Filed: Nov. 4, 1994

[51] Int. Cl.⁶ .......................... G03B 17/02; G03B 17/26
[52] U.S. Cl. ............................... 396/538; 396/512
[58] Field of Search ........................ 354/173.1, 174, 354/275, 288, 289

[56] References Cited

U.S. PATENT DOCUMENTS

| | | | |
|---|---|---|---|
| 1,389,164 | 8/1921 | Roikjer | 354/212 |
| 2,771,825 | 11/1956 | Naumann . | |
| 4,149,793 | 4/1979 | Date | 354/288 |
| 4,363,547 | 12/1982 | Hashimoto et al. | 354/275 |
| 5,049,914 | 9/1991 | Dassero | 354/288 |
| 5,105,211 | 4/1992 | Kameyama | 354/173.1 |
| 5,142,316 | 8/1992 | Tanii et al. | 354/288 |
| 5,155,514 | 10/1992 | Tamamura | 354/174 |
| 5,159,365 | 10/1992 | Takahashi et al. | 354/21 |
| 5,179,402 | 6/1993 | Komatsuzaki et al. | 354/212 |
| 5,231,438 | 7/1993 | Smart | 354/288 |
| 5,359,378 | 10/1994 | Zander et al. | 354/275 |
| 5,432,573 | 7/1995 | Lawther et al. | 354/174 |

*Primary Examiner*—Michael L. Gellner
*Assistant Examiner*—Michael Dalakis
*Attorney, Agent, or Firm*—Peter J. Bilinski

[57] ABSTRACT

An improved film cartridge handling mechanism for effecting end-wise loading of a film cartridge into a deployable loading chamber of a camera for automatic film advance into a film transport path on closure of the loading chamber, for locking the loading chamber in the closed position when the filmstrip is advanced from the film cartridge, and for preventing the loading chamber from being deployed when the filmstrip is in the filmstrip transport path. A film cartridge is aligned with the filmstrip transport path, and the cartridge film door is opened on movement of the film loading chamber into the closed position. The filmstrip is advanced through the filmstrip transport path past the exposure gate and into a takeup chamber as exposures are made and rewound after all exposures are made. A filmstrip edge sensor is deflected by the presence of the filmstrip in the filmstrip transport path indicating that the film door is open and interferes with the opening mechanism for deploying the film loading cartridge.

14 Claims, 6 Drawing Sheets

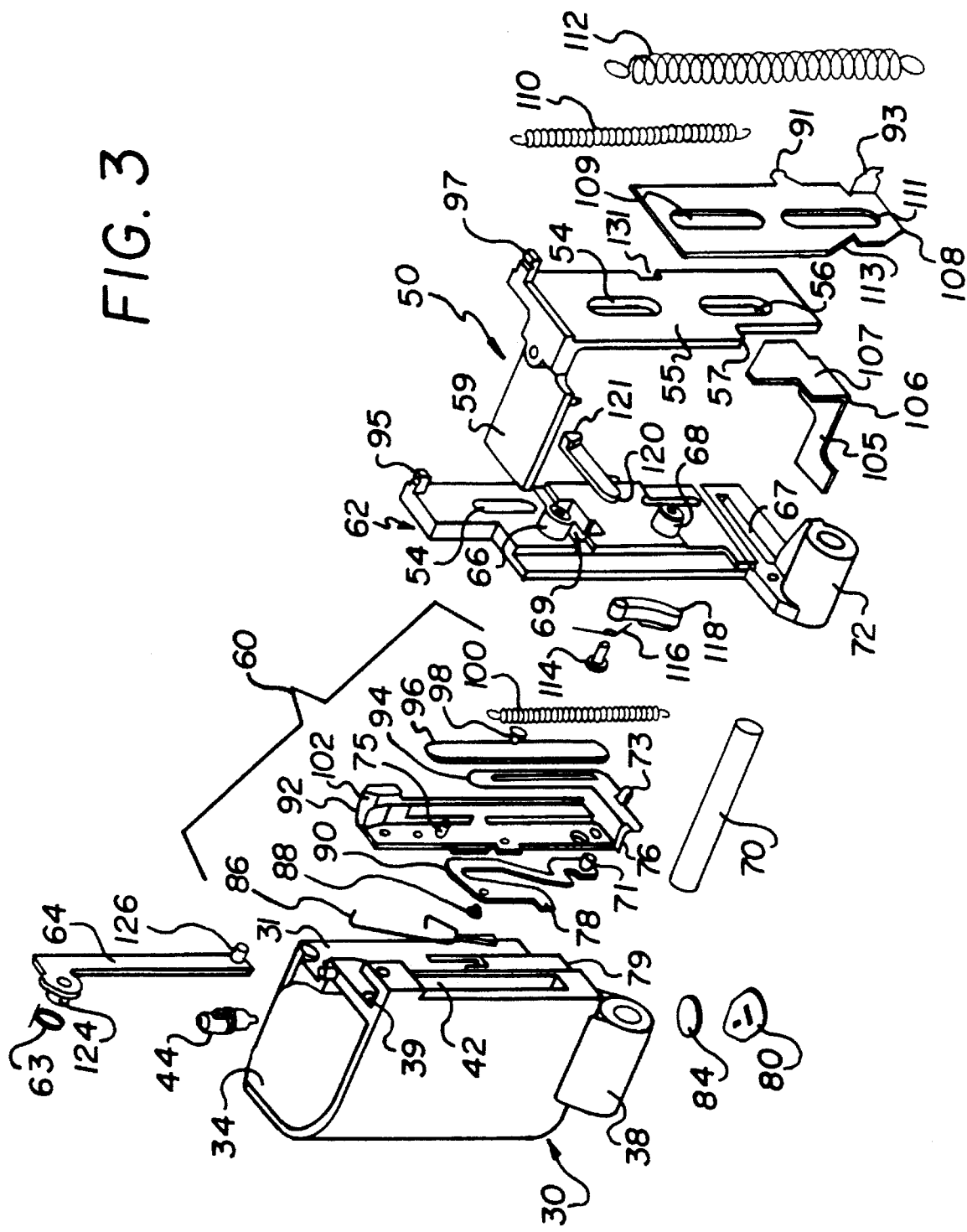

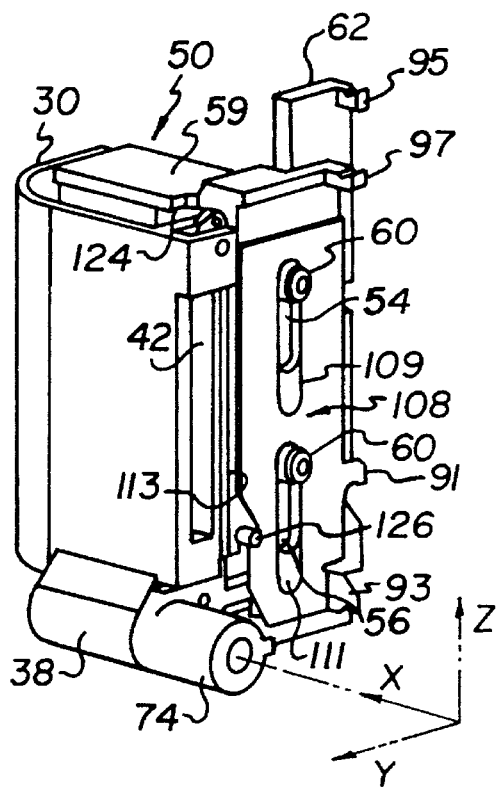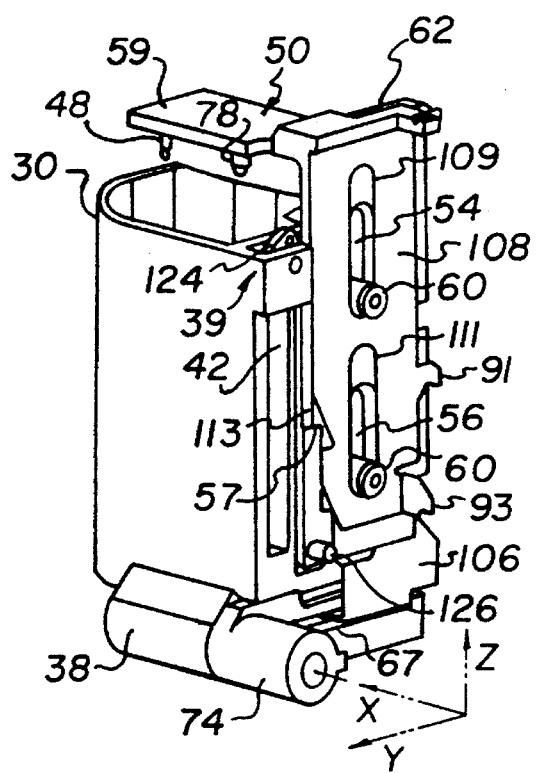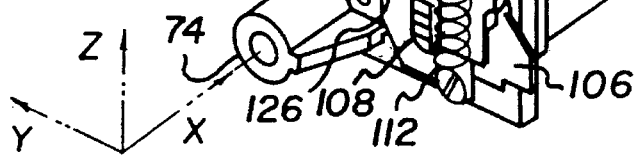
FIG. 12
FIG. 13
FIG. 4

5,563,672

INTERLOCK MECHANISM FOR PREVENTING DEPLOYMENT OF FILM LOADING CHAMBER OF A CAMERA

CROSS-REFERENCE TO RELATED APPLICATIONS

Reference is made to the following commonly assigned, co-pending patent applications, including: Ser. No. 075,969, filed Jun. 11, 1993, by Lawther et al., entitled APPARATUS FOR CONTROLLING THE MOVEMENT OF A FILM CARTRIDGE FROM A LOADING CHAMBER IN A CAMERA; Ser. No. 072,619, filed Jun. 4, 1993, by Richiuso et al., entitled CASSETTE EJECTING APPARATUS; Ser. No. 205,001 filed on Mar. 1, 1994, by Lawther et al., entitled FILM CARTRIDGE LOADING APPARATUS FOR CAMERA; Ser. No. 204,723 filed on Mar. 1, 1994, by Lawther et al., entitled FILM CARTRIDGE LOADING AND EJECTING APPARATUS FOR CAMERA; Ser. No. 227,170 filed on Apr. 14, 1994, by Lawther et al., entitled CAMERA WITH CARTRIDGE HOLDER MOVABLE BETWEEN OPEN AND CLOSED POSITIONS AND MEANS FOR MOVING A FILM CARTRIDGE AT LEAST PART WAY OUT OF THE CARTRIDGE HOLDER; and Ser. No. 08/334,289 filed concurrently herewith by Fuss et al. and entitled, DEPLOYABLE CAMERA CHAMBER FOR RECEIVING AND CENTERING A FILM CARTRIDGE.

FIELD OF THE INVENTION

The present invention relates generally to the field of photography, and more particularly, to an improved film cartridge handling mechanism for effecting end-wise loading of a film cartridge into a deployable loading chamber of a camera for automatic film advance into a film transport path on closure of the loading chamber, for locking the loading chamber in the closed position when the filmstrip is advanced from the film cartridge, and for preventing the loading chamber from being deployed when the filmstrip is in the film transport path.

BACKGROUND OF THE INVENTION

In conventional cameras, 35 mm film cartridges or cassettes are loaded from the side through a hinged camera back into a loading chamber on one side of the image frame exposure gate, and the filmstrip is either manually or automatically directed through the exposure gate and wound on a take-up reel. After all image frames are exposed, the filmstrip is either automatically rewound by a motorized drive or manually rewound into the cartridge. The cartridge is then typically removed by opening the hinged camera back, releasing the drive from the cartridge spool hub and manually withdrawing the cartridge from the loading chamber.

More recently, it has been proposed to load and eject conventional 35 mm cartridges and "thrust" style film cartridges in an end-wise fashion through a sliding or pivoted door in the bottom, top or side of the camera body and to employ motorized filmstrip winding and rewinding apparatus to advance and rewind the filmstrip with respect to the cartridge. Such cameras are disclosed in various configurations, for example, in commonly assigned U.S. Pat. No. 5,049,914 and in U.S. Pat. Nos. 4,363,547, 5,105,211, 5,155,514, 5,159,365 and 5,142,316, and 5,231,438.

In the '914, and '438 patents, and in the above listed patent applications, a camera loading chamber and mechanism is provided for receiving a thrust style film cartridge which does not have a protruding film leader and has an actuable cartridge door through which the filmstrip is advanced and rewound when the door is opened. Referring now to the drawings and first to FIG. 1, it depicts in perspective view a thrust style film cartridge 10, as shown in the above-referenced '170 application, containing a filmstrip wound on and attached at one end to a spool (both obscured within the opaque plastic cartridge shell). The two ends of the spool hub 16 are exposed through light-tight, bearing openings in the free end 11 and seated end 12 of the cartridge 10, so that the spool and attached filmstrip may be rotated by rotation of the spool hub 16 upon seating of the cartridge 10 in a camera film loading chamber.

The film cartridge 10 is shaped to form an elongated snout or lip 14 having a filmstrip passage door 18 therein (depicted in a closed position). The door 18 fits in a door opening 24 and is attached to a rotatable door drive hub 26 that extends through openings in the free end 11 and seated end 12. The door 18 and rotatable door drive hub 26 are formed in one piece and comprise a light lock for the cartridge when fitted into the door opening 24 that replaces the passive, relatively tight, plush lined light lock employed for many years on 35 mm film cartridges. The free end of the filmstrip may be thrust out of the cartridge shell 12 through the door opening 24 by application of counter-clockwise rotary motion to the door drive hub 26 to open the door 18 and by the application of clockwise rotary motion to the spool hub 16 at the seated end 12 to thrust its leading end out past the open door 18.

A retention slot 20 is depicted formed in the inner surface of cartridge snout 14 extending longitudinally between portions 22 and 23 of respective ends of cartridge snout 14 and cartridge shell 12. The retention slot 20 may be employed for cooperation with a spring loaded retention member of the type described in the above referenced '969 patent and '170 application for preventing the cartridge 10 from falling out of or being forcibly ejected completely from the loading chamber 30 when it is deployed in the manner described therein. In particular, the slot 20 may be engaged by a retention member during movement of the film cartridge 10 from the camera loading chamber as proposed in certain of the above-referenced co-pending applications. Various improved apparatus and methods are disclosed therein for receiving and ejecting the cartridge from the loading chamber, wherein the retention slot 20 is engageable by various retention members upon partial insertion into the chamber and remains in engagement upon ejection to prevent the film cartridge 10 from falling out of the loading chamber. The user may typically complete the withdrawal of the cartridge 10 by simply pulling the partially ejected cartridge out, overcoming the retention force.

In certain of the above-listed patents and in all of the above-listed patent applications, the film cartridge loading chamber or holder is either deployable outward from the camera body, as shown for example in the '316, '547 and '211 patents, or is accessible through an end cover as shown in the '438 patent. Latch mechanisms are required for closing the end covers or securing the deployable chamber in the closed position. The '316 patent discloses a typical outward deployable cartridge holder for accepting a film cartridge. In one embodiment, the holder is pivotally supported by a shaft for movement between an outwardly deployed open position in which the holder projects transversely from the camera body and a closed position in which the cartridge holder stands vertically in the camera body. Upon movement into the closed position and with a film cartridge inserted, the upper end of the cartridge is engaged by a lever to hold the cartridge down. The cartridge holder is normally urged towards the open position. A locking lever operates to retain the cartridge holder in the closed position and is coupled with a knob exposed to the exterior of the camera body. A pin extending from the cartridge holder chamber is engaged by the locking lever. The pin is released from the locking lever by manually operating the knob, and the cartridge holder then pivots toward the open position.

In all of the above described mechanisms, the film spool in the film cartridge is engaged at one end by a motorized or manual rewind drive mechanism (for conventional film cartridges) or by a motor driven advance and rewind drive mechanism (for thrust type film cartridges). The other end of the cartridge is typically left free or pressure is applied to the free end (as in the '316 patent described above) and/or laterally to the side of the film cartridge snout or lip by operation of the retention members described above.

In certain of the above-listed patents and in all of the above-listed patent applications, the film cartridge loading chamber or holder is either deployable outward from the camera body, as shown for example in the '316, '547 and '211 patents, or is accessible through an end cover as shown in the '438 patent. Latch mechanisms are required for closing the end covers or securing the deployable chamber in the closed position.

The '316 patent discloses one design of an outward deployable cartridge holder for accepting a film cartridge. In one embodiment, the holder is pivotally supported by a shaft for movement between an outwardly deployed, open position in which the holder projects transversely from the camera body and a closed position in which the cartridge holder stands vertically in the camera body. Upon movement into the closed position and with a film cartridge inserted, the upper end of the cartridge is engaged by a lever to hold the cartridge down. The cartridge holder is normally urged towards the open position. A locking lever operates to retain the cartridge holder in the closed position and is coupled with a knob exposed to the exterior of the camera body. A pin extending from the cartridge holder chamber is engaged by the locking lever. The pin is released from the locking lever by manually operating the knob, and the cartridge holder then pivots toward the open position. Prevention of deploying the cartridge holder with the filmstrip advanced across the exposure gate does not appear to be mentioned. If a filmstrip were extending from the cartridge, it would interfere with the opening motion but only after the deployable film chamber opened partially. The filmstrip could be fogged and damaged in the process.

The '438 patent discloses a stationary film loading chamber with an end opening covered by a loading chamber door that can be opened or closed by manipulation of a slidable door latch so that a thrust film cartridge of the type described above can be loaded or ejected through the open loading chamber door. As indicated in the '438 patent, it is not desirable to allow the loading chamber door to be opened when the filmstrip is extending out of the cartridge door or "light valve", since the filmstrip image frames would be fogged. To prevent this from happening, the loading chamber door latch cannot be released by the user if the film door cannot be closed because the filmstrip is extending through it. This approach depends on contact of the film door with the filmstrip image frame.

The prior art as described above lacks a simple system for detecting the extension of the filmstrip out of the film cartridge and into the filmstrip transport path, particularly for a thrust cartridge, and a deployable film loading chamber that ensures that no damage will be done to the filmstrip or filmstrip image frame.

SUMMARY OF THE INVENTION

It is therefor a principal object of the present invention to provide an interlock mechanism that inhibits opening of a deployable film loading chamber from the closed position to the open position thereof when the filmstrip is present in the camera film transport path.

It is a further object of the present invention to provide an interlock mechanism that senses the presence of the filmstrip in the filmstrip transport path without contacting the filmstrip or engaging the image frame of the filmstrip.

It is a still further object of the invention to provide an interlock mechanism that detects and is deflected by a filmstrip in the filmstrip transport path and does not require any modification of the filmstrip or film cartridge.

In accordance with the invention, an improved camera is provided for receiving a photographic filmstrip cartridge having a filmstrip wound around a filmstrip spool within a film cartridge housing, the cartridge housing having first and second ends with end openings through which the spool hub of the filmstrip spool is exposed, the camera comprising a camera body enclosing a camera frame having a film supply cavity and a filmstrip transport path, and a film loading chamber for receiving the film cartridge; characterized in that the camera includes deploying means for pivotally moving the film loading chamber between a deployed position for receiving the film cartridge, end first, into an end opening thereof and a closed position wherein the film loading chamber is pivoted into the film supply cavity to position the film cartridge in alignment with the filmstrip transport path; filmstrip drive means for advancing the filmstrip from the film cartridge into the filmstrip transport path when the loading chamber is moved to the closed position; and interlock means for sensing the presence of the filmstrip in the filmstrip transport path for inhibiting deployment of the film loading chamber and film cartridge to the deployed position by the deploying means.

Preferably, the interlock means further comprises an interlock lever having a first and second end and a pivotal mounting point positioned in relation to the filmstrip transport path for pivotal movement of the first end into the filmstrip transport path in the absence of a filmstrip therein and the second end into an interfering engagement with the deploying means for inhibiting deployment of the film cartridge to the deployed position.

In addition, the first end of the interlock lever preferably makes contact with a side edge of the filmstrip and the contact causes the second end to interfere with the deploying means if an attempt is made by the user to unlatch the film loading chamber and allow its deployment.

Advantageously, the present invention provides for a side edge contact of the filmstrip outside the image frame area to be employed to inhibit deployment of the film loading chamber to thereby prevent damage to the filmstrip image frames.

Other objects, advantages and features of the present invention will become apparent from the following specification when taken in conjunction with the accompanying drawings.

BRIEF DESCRIPTION OF THE DRAWINGS

FIG. 3 is an exploded perspective view of the components of the film loading apparatus of FIG. 2;

FIG. 4 is a perspective assembly view of certain of the components of FIG. 3;

FIGS. 12–14 are further perspective views of the operation of the film loading apparatus depicting the manner in which the loading chamber is deployed from the closed position of FIG. 11 to the open position of FIG. 2.

DETAILED DESCRIPTION OF THE PREFERRED EMBODIMENTS

Figure 1:
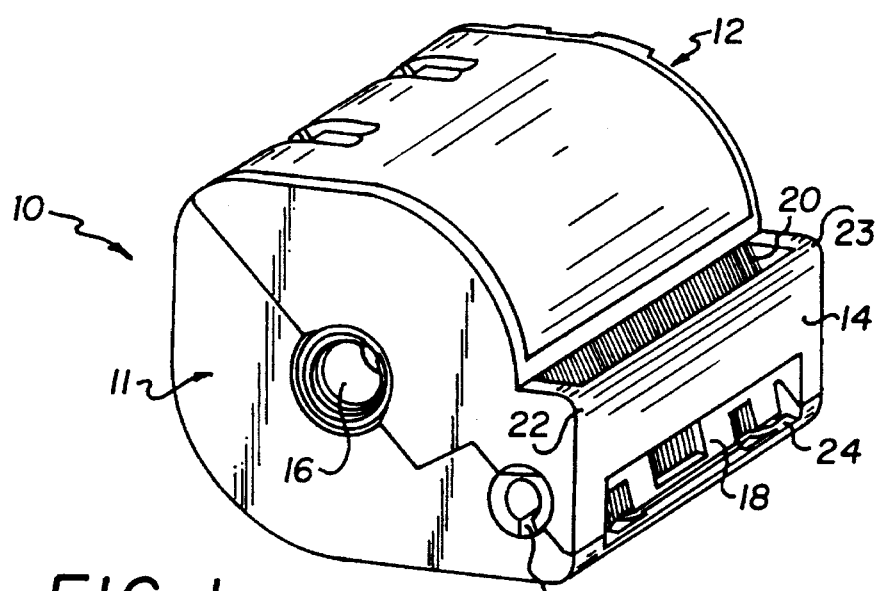
FIG. 1 is a perspective view of a thrust type film cartridge usable in the film loading apparatus of the present invention.

The invention is disclosed as being embodied preferably in a still-picture camera employing a thrust type film cartridge of the type shown in FIG. 1. The specific camera in which the present invention may be incorporated may take any of the forms known in the art having a film loading chamber on one end of the camera body and a take-up chamber for the filmstrip on the other end of the camera body and an image frame exposure gate between the two ends. A battery powered, reversible motor drive is provided to engage the spool of the film cartridge after it is loaded to advance the leading end of the filmstrip from the film cartridge through the exposure gate and into the takeup chamber. During the taking of photographs, the filmstrip is advanced by rotation of a takeup spool an image frame at a time. The film cartridge spool is rotated in the reverse direction to rewind the filmstrip from the takeup chamber back into the film cartridge after all image frames are exposed. In that process, the filmstrip is guided along its edges between spaced rails and a backing plate to be aligned as nearly as possible with an image focus plane in the exposure gate. Photographic exposures are made in the image frames in the exposure gate through operation of the aperture setting and shutter release mechanisms of the camera in a manner well known in the art. Because the features of this type of camera are generally well known, the description which follows is directed in particular to camera elements forming part of or cooperating directly with the preferred embodiments of the film loading chamber apparatus. It is to be understood, however, that other elements not shown or described may take various forms known to one of ordinary skill in the art.

The preferred embodiment of the present invention is described in the context of the apparatus disclosed in the above-referenced, co-pending Ser. No. 08/334,289 application. The secure and accurately positioning of the film cartridge is emphasized so that the filmstrip is aligned to the image focus plane of the camera despite position variances that arise due to dimensional tolerances between the outer dimensions of the filmstrip cartridge 10 and the inner dimensions of the magazine of the loading chamber and the reduced size of the film cartridge. In accordance with a principal aspect of the present invention, the deployment of the film loading chamber disclosed therein is inhibited when the filmstrip is extended into the camera filmstrip transport path.

Figure 5:
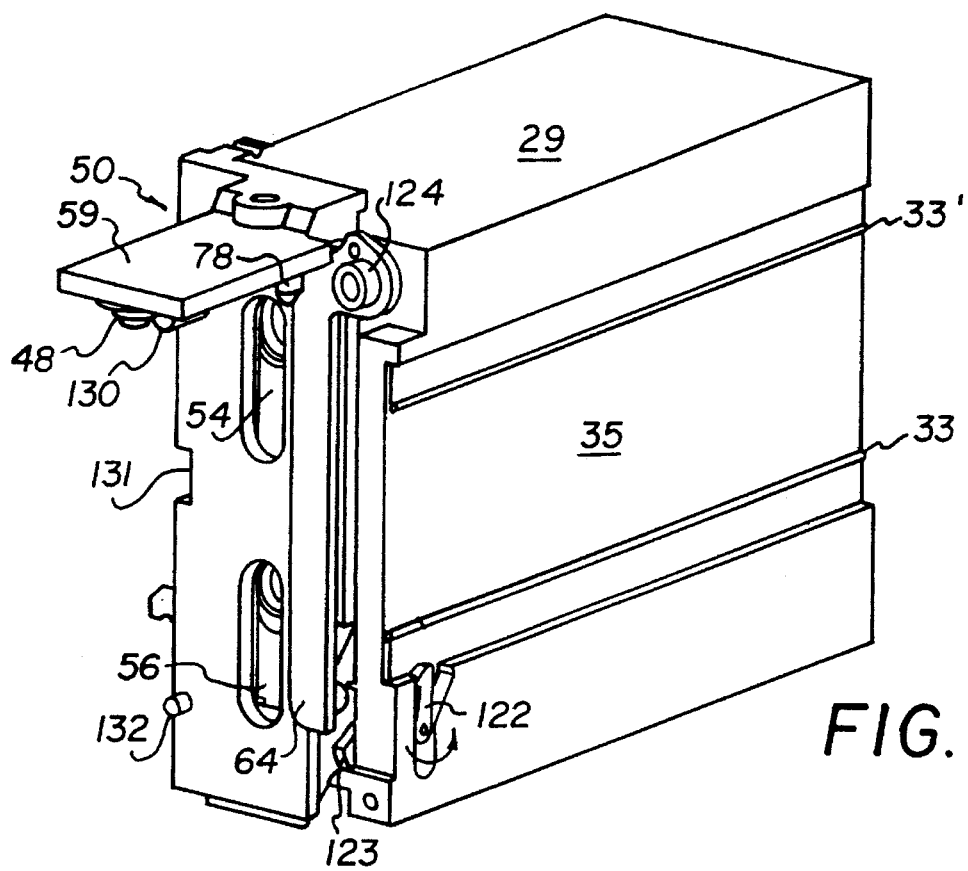
FIGS. 5 and 6 are perspective views of certain of the components of FIG. 3 assembled to a camera frame providing a film transport path.
Figure 6:
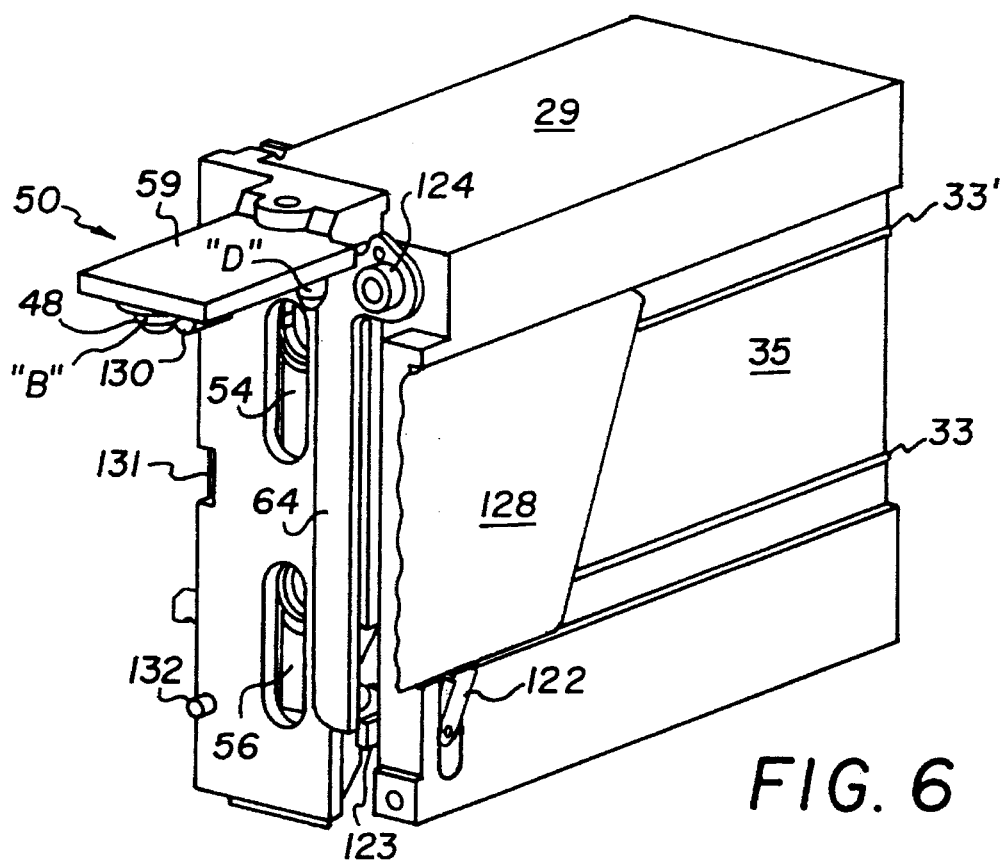

FIGS. 2–14 depict a preferred embodiment of a film loading mechanism for a side deployable film loading chamber that provides interlock of the deploying mechanism with the presence of a filmstrip in the film transport path in the film loading apparatus that also provides for the accurate and precise positioning of the film cartridge and the filmstrip contained therein with respect to the film transport path of the camera. FIGS. 5 and 6 specifically depict an interlock lever mechanism for detecting the filmstrip presence in the film transport path and for inhibiting deployment of the film loading chamber in conjunction with the present invention. The following thus describes the invention in the context of a preferred embodiment in which it may be implemented.

For reference purposes, the following definitional terms relating to the alignment of the filmstrip with the filmstrip transport path are set forth. Spool hub 16 of the film cartridge 10 is engaged at the film cartridge seated end 12 by a drive spindle at a locator point "A" and at the free end 11 at a locator point "B" by a B-point locator pin as the loading chamber is latched in the loaded or closed position, so that the axis of rotation of the filmstrip spool is fixed. Similarly, the door drive hub 26 is engaged at the seated end of the cartridge 10 by a cartridge door door driver carried by the film loading chamber to define a locator point "C" for the cartridge lip 14. A fourth locator point "D" may be provided optionally to fit within the other end of the single piece door drive hub 26 exposed through an opening of the free end of the film cartridge end. The locator points "A" and "B" are aligned to define a first axis referenced orthogonally to the hinge axis of the deployable film chamber and in parallel with the filmstrip transport path of the camera. The locator point "B" is referenced to a latch pin for engaging and latching the film loading chamber in the loaded position. The locator point "C", and optional locator point "D", is referenced to the hinge mechanism to align the cartridge end 14 with the filmstrip transport path.

Figure 2:
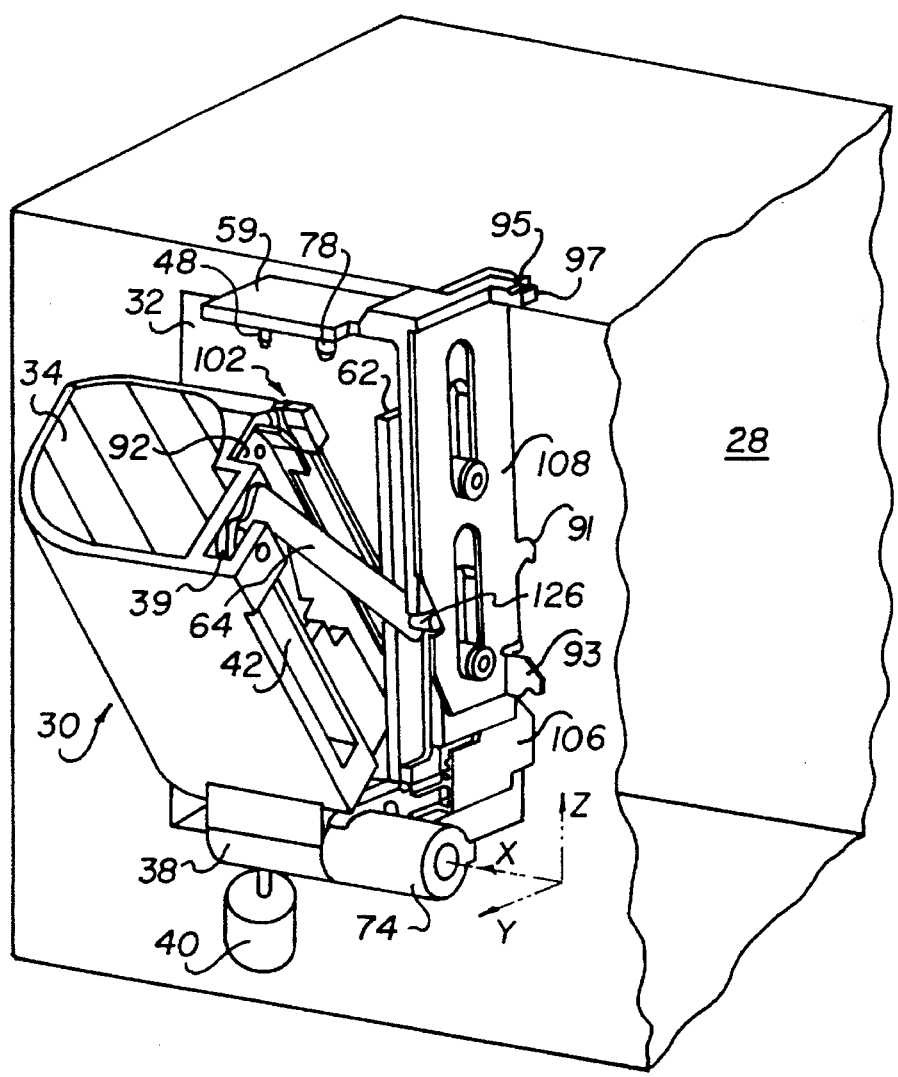
FIG. 2 is a perspective, partial view of the components of a first embodiment of the positive film cartridge loading and ejecting apparatus of the invention in the deployed position for receiving a film cartridge in relation to a camera body.

Turning to FIG. 2, the film cartridge 10, FIG. 1, is intended to be inserted end-wise into the magazine 34 of a deployed film loading chamber 30 that is pivotable at one hinged end 38 thereof out of a film supply cavity 32 in the side of a camera body 28 of the type described above. The elongated magazine 34 is shaped to fit the outer shape of the cartridge housing 12, FIG. 1, and to receive the full length of the cartridge 10, FIG. 1, within it, with the seated end 12, FIG. 1 of the film cartridge 10, FIG. 1, inserted downward into the magazine 34. When the film cartridge is received, the door drive hub 26 of the film cartridge 10, FIG. 1, is engaged and centered by an cartridge door driver (not shown) as the C-point locator, which is then ready to open the door 18. Similarly, the end of the spool hub 16, FIG. 1, accessible from the seated end 12 is seated and centered onto the drive spindle providing the A-point locator. The optional D-point locator pin 78 in alignment with the cartridge door driver is also depicted in FIG. 2.

As the film loading chamber 30 is pivoted into the film supply cavity 32, the loading chamber 30 is latched closed in a manner described below. Full closure and latching of the film loading chamber 30 into film supply cavity 32 also effects the centering of the spool hub 16, FIG. 1, accessible from the free end 11, FIG. 1, onto a B-point locator pin (described below). The door opening driver is simultaneously rotated to open the door 18, FIG. 1. The drive spindle 45 (shown in FIG. 10) is connected through a gear drive train (not shown) to a schematically illustrated filmstrip advance and rewind drive mechanism 40. The drive mechanism 40 may be then operated to advance the filmstrip out through the door opening 24 past the open door 18. The drive mechanism 40 is shown schematically, and it will be understood that, in practice, a drive motor is mounted in the camera body and a reduction gear drive assembly is provided between the drive motor and a drive spindle 45 (shown in FIG. 10) that engages the spool hub 16 when the film cartridge 10, FIG. 1, is loaded into the magazine 34 of the film loading chamber 30. Such a motor and gear drive assembly is shown, for example, in U.S. Pat. No. 2,548,549, incorporated by reference herein.

In this closed position, the cartridge door 18, FIG. 1, is aligned along the axis of the A-point locator and the B-point locator pin and stabilized from rotation about the axis by the engagement of the cartridge door driver with the door opening hub 26 providing the C-point locator. The filmstrip is aligned with a filmstrip passage 42 in the loading chamber 30 through which the filmstrip leading end may be advanced toward the camera exposure gate and take-up chamber (not shown). The filmstrip passage 42 is aligned precisely to film guiding rails (shown in FIGS. 5 and 6) of the camera body 28 so that the filmstrip leading end is thrust out of the filmstrip cartridge 10 in alignment therewith and does not twist or stub as it is advanced. After the filmstrip leading end is advanced a certain distance, it enters the takeup chamber and is wound about a takeup hub which is rotated during subsequent image frame advancement as described above.

To summarize the operation of the preferred embodiment, the latching of the film loading chamber 30 when it is manually pushed into the film supply cavity 32 is effected by the downward movement of a laterally extending latch pin from a B-plate 50 (obscured in this view), which is affixed for relative downward movement with respect to the camera body 28, into engagement with the latch slot 102 of a mounting plate 92 in a manner described more fully below. At the same time, a downwardly projecting B-point locator pin 48 extending from the horizontal extension 59 of the B-plate 50 engages and centers the spool hub 16 accessible from the free end 11 of the cartridge while the other end of the spool hub 16 is seated on the spindle 45 of the film drive mechanism 40. As downward movement of the B-plate is completed, the cartridge door driver 44 seated in the rotatable door hub 26 rotates to open the door 18. In this manner, the film cartridge 10 is fixedly centered in the magazine 34 by positive seating of its spool end hub 16 axially between the drive spindle 45, the A-point locator and the B-point locator pin 48, wherein the loading chamber 30 is also latched to the B-plate 50. Since the B-plate 50 and the lower hinged end 38 are secured to the camera body 28, the film cartridge snout 14 and door 18 are precisely aligned and stably retained in relation to the filmstrip transport path of the camera body 28.

Figure 7:
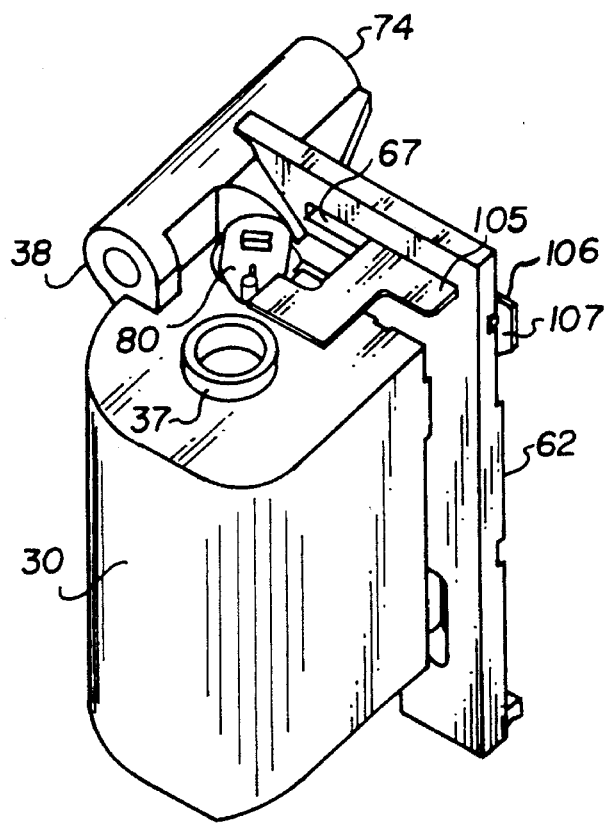
FIG. 7 is a bottom perspective view of the assembly of FIG. 3 depicting the mechanism for opening and closing the film cartridge door.
Figure 10:
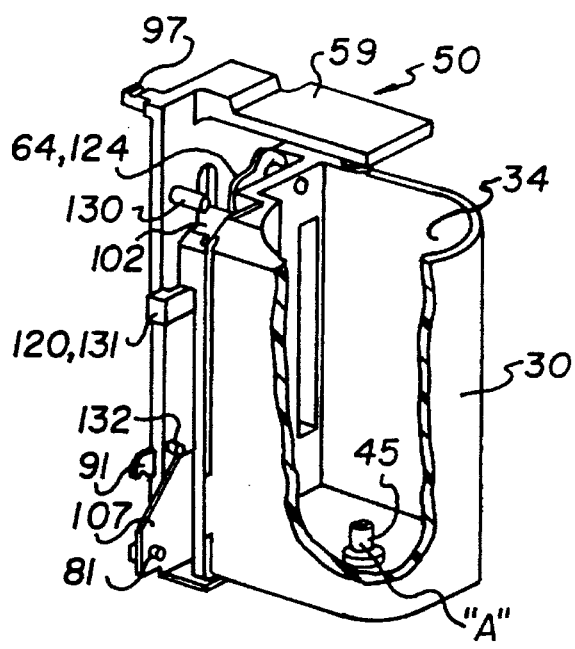

The components of the preferred embodiment are depicted in greater detail in the exploded view of FIG. 3, the assembly view of FIG. 4 and the partial perspective views of FIGS. 5, 6 and 7. The film loading chamber 30 is constructed of a single piece of molded plastic or the like having the magazine 34 and filmstrip passage 42 formed therein and a hinge pin receptacle 46 at the hinged end 38 thereof. The film loading chamber 30 is also formed to have attachment points and recesses to accommodate certain of the component group 60 for seating and partially ejecting the film cartridge 10 depicted in FIG. 3, as described below. A mounting plate 62 is attached to the camera body 28 (FIG. 2) and the B-plate 50, while associated components are mounted to the mounting plate 62 for relative movement with respect to it and the components attached to the film loading chamber 30. The interconnection between the film loading chamber 30, including the component group 60, is made through the cocking lever 64 and the lower hinge formed by the hinge pin 70 fitting within the hinge pin receptacle 72 in the hinged end 38 of the film loading chamber 30 and the hinge pin receptacle 74 attached to the mounting plate 62, respectively. The cartridge door driver assembly, including the driver 44 attached to cartridge door driver lever 80 and spring 84 is positioned on the base of the film loading chamber 30 for insertion into the door hub 26 and rotation on upward and downward movement of the B-plate 50 in a manner described below. The drive spindle 45, providing the A-point locator that makes engagement with the spool hub 16 when the film cartridge 10 is loaded into the magazine 34, is obscured from view in FIG. 3 but is shown in FIG. 10.

The component group 60 includes detent spring 86, ejector latch stud 88, ejector latch 90, mounting plate 92, slide ejector 94, retaining plate 96, slide ejector stud 98, and slide ejector spring 100. The component group 60 is mounted against the vertical side wall 31 of the film loading chamber 30 in the sequence depicted in FIG. 3 to form the assembly which is depicted in FIG. 2. The component group 60, although changed in certain details, operates in cooperation with wipe-by cam screw 114, wipe-by cam spring 116, and wipe-by cam 118 in a manner described in the above-referenced '170 application, which is not specifically illustrated in this application.

In general, the wipe-by cam 118 and spring 116 are mounted to the camera frame 29 (shown in FIG. 5). The ejector latch 90 is attached to the mounting plate 92 for pivotal movement by the ejector latch stud 88 so that the pin 71 bears against the wipe-by cam 118. Slide ejector 94 is attached between retaining plate 96 by slide ejector stud 98 extending through the elongated slot of the slide ejector 94 and attached to the mounting plate 92. Slide ejector spring 100 is attached between pin 75 and tab 73. Tab 76 extends against the seated end of cartridge 10.

When a cartridge 10 is inserted into the magazine 34 of the loading chamber 30 in its deployed position and pressed to the fully seated position, the tab 76 is pressed downward and slide ejector spring 100 is tensioned. Detent spring 86, which is attached to a pin (obscured) between plate 92 and surface 31 is biased to extend into the slot 20 of the film cartridge 10, when the cartridge is seated within the magazine 34. The free end 78 of ejector latch 90 engages the cartridge retention slot 20, holding the cartridge 10 in its seated position, preventing the cartridge from falling to the detent spring 86 in case the camera is inverted at this point.

As the film loading chamber 30 deploys into the open position, the pin 71 on the slide ejector latch 90 strikes the underside of the wipe-by cam 118, which does not rotate when struck from this direction. The pin 71 is therefore forced to slide over the cam surface of wipe-by cam 118, causing the free end 79 of ejector latch 90 to withdraw from the cartridge retention slot 20. The withdrawal of the free end 79 allows the cartridge to rise in response to the biasing force of the slide ejector spring 100. The slide ejector 94 is released when the latch surface is withdrawn from the tab 76. The cartridge 10 is then lifted by the tab 76 into an ejected (unseated) position for manual withdrawal by the user.

When the components of group 60 are assembled to one another and the film loading chamber 30, the latch slot 102 of mounting plate 92 is positioned to receive a latch pin (obscured from view) extending horizontally from the vertical plate extension 55 of B-plate 50. At the same time, the B-point locator pin 48 makes engagement with the spool hub 16 to securely align the film cartridge 10 and the film loading chamber 30 in the manner described above.

Turning to the mounting plate components depicted in FIG. 3, they include the mounting plate 62, B-plate 50, cartridge door driver lever actuator 106, spring plate 108, spring plate spring 110, B-plate spring 112, and B-plate trigger 120. These components are assembled as shown in the assembly view of FIG. 2, except that the springs 110 and 112 have been removed in that view to clarify the illustration. FIG. 4 presents a further perspective view taken at a different angle with the springs 110 and 112 attached at one end to separate tabs 91 and 93, respectively, on the spring plate 108 and at the other end to tab 95 on the mounting plate 62 and to tab 97 on the B-plate 50, respectively, (shown in FIG. 3). As shown in FIG. 4, the springs 110 and 112 are extended, since the B-plate 50 is extended above the loading chamber 30 into its extended position. The B-plate spring 112 tends to pull the B-plate 50 and the spring plate 108 together. The spring plate spring 110 tends to pull the spring plate 108 upward with respect to the mounting plate 62 in the pre-latch position. As shown, the B-plate 50 is poised to move downward to make the engagement with the cartridge spool hub and latch slot in this position.

The B-plate spring 112 is stronger than the spring plate spring 110 because the force of the B-plate spring 112 is required to seat the film cartridge 10. The force of the spring plate spring 110 lifts the B-plate and the spring plate 108 away from the free end of the cartridge 30 during deployment of the film loading chamber 30.

The mechanical attachment plate 62 is physically attached to the camera body 28 capturing the cartridge door driver lever actuator 106, the B-plate 50, the spring plate 108, the B-plate trigger 120, and the springs 110 and 112 therebetween. The B-plate trigger 120 is captured in a slot in the mechanical attachment plate 62. These components are viewed from the camera body side in FIGS. 2 and 4 and are further viewed from inside the film supply cavity 32 assembled to the camera frame 29 in FIGS. 5 and 6. The vertical plate section 55 of the B-plate 50 nests between the vertical mechanical plate 62 and the vertically disposed spring plate 108 as described above, and the horizontal plate extension 59 extends over the open end of the magazine 34. When so assembled, the B-plate 50 and the spring plate 108 are slidable vertically up and down between the extended and engaged positions with respect to the mechanical attachment plate 62 and the cartridge door driver lever 106. The range of movement of the B-plate 50 and the spring plate 108 is provided by the elongated slots 54 and 56 in the vertical plate extension 55, which nests into the studs 66 and 68. The studs 66 and 68 also extend through elongated openings 109 and 111 in the spring plate 108 and are attached to the camera frame 29 by attachment screws (not shown) that are screwed in through the film supply cavity 32 with the film loading chamber 30 tilted outward. A further point of attachment with camera frame 29 may also be provided adjacent to the hinge receptacle 74 in the mechanical plate 62. The manner in which the B-plate 50 and the spring plate 108 are moved longitudinally in the vertical or Z-direction with respect to the studs 66 and 68 and mounting plate 62 will be described in detail below.

As shown in FIGS. 1–3, the cocking lever 64 and a cocking lever spring 63 are pivotally mounted at axle end 124 on an axle pin (not shown) within the recess 39 of the loading chamber 30, so that the spring 63 biases the cocking lever to rotate rearwardly in the film supply cavity 32. A pin 126 at the other end of the cocking lever 64 engages a shoulder 57 in vertical plate extension 55, and also bears against the sloped notch 113 of the spring plate 108.

Referring now to FIGS. 5 and 6, the above described assembly is oriented against the end of the interior camera frame 29 (with the hinge member 74 removed from the mechanical plate 62 for clarity of view). The camera frame 29 is schematically depicted as providing first and second film guide rails 33, 33' of a film transport path 35 which is aligned with the elongated window opening 42 of the film loading chamber 30. It will be understood that the backing plate of the camera body that defines the other side wall of the film transport path 35 is also not shown in FIGS. 5 and 6.

FIGS. 5 and 6 show other features, including the location of the cocking lever 64 with respect to the B-plate 50 and the spring plate 108, FIG. 2, and, particularly, a locking mechanism for preventing deployment of the loading chamber 30 when a filmstrip is in the film transport path 35. In this regard, when a filmstrip is not present in the film transport path 35, the interlock lever 122 pivots counter-clockwise under the force of an internal torsion spring wound about an axle pin of interlock lever 122, so that the interlock lever end or arm 123 is biased to extend below the free end of the cocking lever 64. In this position shown in FIG. 5, the interlock lever arm 123 does not inhibit the pivotal movement of cocking lever 64 about its pivot end 124 mounted to the film loading chamber 30 in the manner depicted in FIG. 2.

Referring to FIG. 6, when a filmstrip 128 is present in the film transport path 35, the interlock lever 122 is pivoted clockwise by the filmstrip 128 lower edge contacting the film transport path lever end or arm 125. The filmstrip 128 is restrained to be relatively flat in the transport path 35 by the pressure of the rails 33, 33' against a backing plate (not shown) and consequently is fairly rigid in the cross-film direction. In order for the camera user to deploy the loading chamber 30, it is necessary to move the free end of the cocking lever 64 outward to release pin 126 from the shoulder 57 of vertical extension plate 55 and notch 113 of the spring plate 108 in a manner described below. When the filmstrip 128 is in the film transport path 35 as shown in FIG. 6, the filmstrip edge contact overcomes the spring bias to rotate the interlock lever arm 123 into an interference position blocking outward movement of the free end of the cocking lever 64. Thus, as long as the filmstrip 128 is in the filmstrip transport path 35, the user cannot move the free end of the cocking lever 64 to deploy the film loading chamber.

The vertical plate extension 55 also includes a further horizontally extending drive pin 132 shown in FIGS. 5 and 6 that engages the angled edge of the vertically extending plate 107 of the cartridge door driver lever actuator 106. The cartridge door driver lever actuator 106 is also depicted in FIGS. 3 and 4 as having the horizontal or X-direction extending lever arm 105 and the vertical or Z-direction extending arm 107. The horizontal extending lever arm 105 extends through the elongated slot 67 in the mechanical mounting plate 62 and interacts with the cartridge door driver lever 80 to control the rotary motion of the cartridge door driver 44, as the film loading chamber 30 is pivoted into the closed position in a manner to be described hereafter.

Turning now to FIG. 7, it depicts a perspective view of the underside of the film loading chamber 30 in relation to the mechanical mounting plate 62 in order to show the interaction of the horizontal lever arm 105 of the cartridge door driver lever actuator 106 with respect to the cartridge door driver lever 80. In FIG. 7, it may be observed that the horizontal plate extension 105 extends through the elongated opening 67 to contact the cartridge door driver lever 80. A bushing surrounding an opening 37 in the film loading chamber 30 is also provided to receive and retain the drive spindle 45 and attached gear (not shown) of the drive mechanism 40 (FIG. 2) for rotation in the opening 37.

Referring to FIG. 10, the drive spindle 45 extending into the magazine 34 engages the spool hub 16, FIG. 1, of the seated end 12 of the filmstrip cartridge 10, FIG. 1, when it is manually inserted and seated in the magazine 34. The drive gear and drive spindle 45 are therefore movable with the film loading chamber 30 between the deployed and closed positions in a manner shown, for example, in the above-referenced '547 patent.

Figure 11:
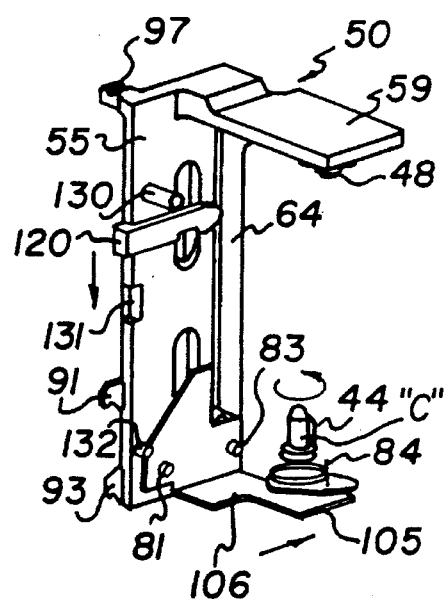

The cartridge door driver lever actuator 106, FIG. 11, is depicted in the position which keeps the film cartridge door 18 closed. The film chamber door 18 is opened upon complete pivoting movement of the film loading chamber 30 back into the film supply cavity 32 after a film cartridge 10 is loaded into the magazine 34 and downward movement of the B-plate 50 and drive pin 132 against the sloped edge of the vertical plate extension 107. When that occurs, the horizontal plate extension 105 moves horizontally in the Y-direction (FIG. 2), that is, along the slot 67 from the position depicted in FIG. 7. When that movement occurs, the cartridge door driver lever 80 is rotated and in turn rotates the cartridge door driver 44 in the clockwise direction (from the point of view of FIG. 7) against the force of the cartridge door spring 84 (FIG. 3). The cartridge door driver 44 is engaged with the door opening hub 26 (FIG. 1) and causes the door 18 to be opened to allow the film strip within the film cartridge 10 to be advance by operation of the film drive mechanism 40.

Figure 8:
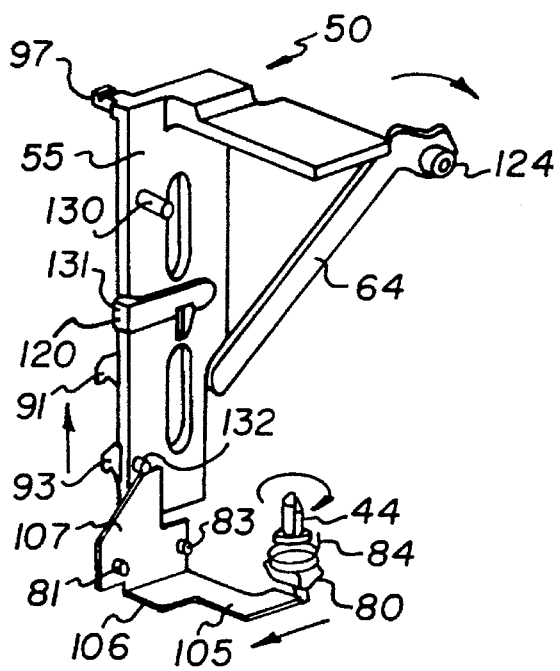
FIGS. 8–11 are further perspective views of the operation of the film loading apparatus during the steps of latching the loading chamber into the closed position with certain components of the assembly removed for ease of illustration.
Figure 9:
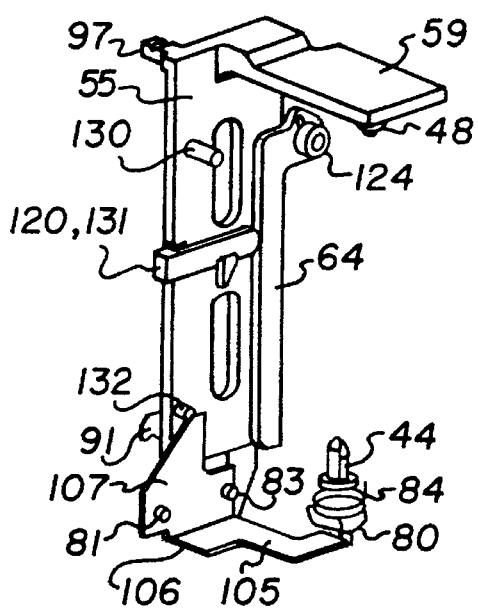

FIGS. 8-11 are further illustrations of the interaction between the movement of the B-plate 50 and the cartridge door driver lever 106 during the steps of latching the loading chamber 30 into the closed position with certain components of the assembly removed for ease of illustration. For example, the mechanical plate 62 is removed, so that the relation of the drive pin 132 with respect to the vertically extending plate 107 of the cartridge door driver lever actuator 106 may be observed as the B-plate 50 moves upward upon opening of the film loading chamber 30 in FIG. 8 and downward on closing and latching as shown in FIGS. 9-11. A pair of guide pins 81, 83 are also shown that fit within a groove in the mechanical plate 62 just above and parallel with the elongated slot 67 to guide the horizontal movement of the cartridge door driver lever actuator 106.

FIGS. 8-11 also show the interaction between the B-plate trigger 120 and the B-plate 50 when the cocking lever 64 is in the deployed position of FIG. 8 and the closed position of FIGS. 9-11. The B-plate trigger 120 is fitted within an elongated retaining slot 69 (shown in FIG. 3) of the mounting plate 62 and retained there between the mounting plate 62 and the vertical extension plate 55 when the plates are assembled to the camera frame 29 as described above. The B-plate trigger 120 can slide back and forth in the retaining slot 69 in the Y-direction without coming out because of its shape with respect to the retaining slot 69. A cam end 121 is formed at one end that fits into the rear cut-out 131 of the vertical extension plate 55 to limit upward travel and lock it in the up and open position of FIGS. 2 and 8. The B-plate trigger 120 is biased outward in the Y-direction by a compression spring (not shown) acting on a downwardly extending tab of the B-plate trigger 120. Therefore, when the loading chamber is closed, the B-plate trigger 120 is pushed rearward by the cocking lever 64 in the closed position and is allowed to move forward when the cocking lever 64 is deployed into the open position of FIG. 2. When the B-plate trigger 120 is pushed rearward by the cocking lever 64 and the cam end 121 is pushed out of the rear cut-out 131, the vertical extension plate 55 is released to move to the engaged position as shown in FIGS. 9-11 under spring tension provided by the B-plate spring 112 and the spring plate spring 110.

FIG. 8 depicts the above assembly with the film loading chamber (not shown) and the cocking lever 64 moving outward into the deployed position and the B-trigger 120 latched into the cut-out 131 of the upwardly moving B-plate 50 at the final point of upward movement. Upward movement is caused by the spring tension of the spring plate spring 110, which is attached to the mounting plate 62. During the upward movement of the drive pin 132, the cartridge door driver lever actuator 106 is moved rearward in the Y-direction, under the influence of the cartridge door spring 84. The release of spring tension rotates the cartridge door lever driver 80 and the attached cartridge door driver 44 in the counter-clockwise direction (from this point of view) to close the door 18 of the film cartridge.

FIG. 9 shows the B-plate 50 in the full up position just as the loading chamber (not shown) is pushed into the camera cavity. At that point, the side of the cocking lever 64 bears against the end of the B-plate trigger 120, which is about to fully move out of the cut-out 131. FIG. 10 shows the same position with the loading chamber 30 partially depicted in order to show the latch pin 130 poised above the latch slot 102. Referring back to FIG. 3, the latch pin 130 extends through the elongated opening 61 in the mechanical mounting plate 62 to make engagement in the latch slot 102 of the mounting plate 92, which is mounted to the side 31 of the film loading chamber 30.

The latch pin 130 is shown extending horizontally out from the vertical plate extension 55 just below the horizontal plate extension 59 of B-plate 50, and the B-point locator pin 48 is shown extending downwardly from the horizontal plate extension 59. The line between the B-point locator pin 48 and the drive spindle 45, extending upwardly through the seated end opening 37 defines the A-B axis of alignment of the filmstrip 10 in parallel with the plane of the filmstrip transport path.

When the cocking lever 64 is fully in the closed position it moves the B-plate trigger 120 and releases cam end 121 from the cut-out 131. The spring tension of the B-plate spring 112 pulls the B-plate 50 downward, FIG. 11, and latches the latch pin 130 firmly into the latch slot 102. The B-point locator pin 48 engages and centers the spool hub 16 of the film cartridge (not shown).

At the same time, the drive pin 132 rides down the slanted edge of the vertical extension plate 107 of the cartridge door driver actuator 106 to move it outward in the horizontal Y-direction. During that movement, the cartridge door driver lever 80 is rotated counter-clockwise (in this view and clockwise, as shown in FIG. 7) to effect the opening of the cartridge door 18.

Turning now to FIGS. 12 and 13 in conjunction with FIG. 2, the loading chamber is shown as deployed from the closed position of FIG. 11 to the open position of FIG. 8. In FIG. 12, the free end pin 126 of the cocking lever 64 is shown in the notch 113 of the spring plate 108, and against the shoulder 57 of the vertical plate extension 55.

In FIG. 13, the cocking lever 64 is pushed out of the notch 113, allowing the spring plate 108 and to B-plate 50 to rise upward by the tension of the spring plate spring 110, FIG. 4. As described above, the cartridge door driver 44 rotates the cartridge door 18 closed. Latch pin 130 is withdrawn from latch slot 102, and B-point locator pin 48 is retracted from the spool hub 16. The B-plate 50 is latched up by the B-plate trigger 120, as shown in and described with reference to FIG. 9 to halt upward movement.

Then, the cocking lever spring 63 pivots the cocking lever 64 downward and outward from the position of FIG. 13, and the loading chamber 30 is deployed to the open position of FIG. 2. As described above with respect to FIG. 6, if the filmstrip is not fully retracted into the film cartridge 10, but rather contacts the interlock lever 122, then the cocking lever 64 cannot pivot forward, and the loading chamber 30 remains in the position of FIG. 13.

Figure 14:
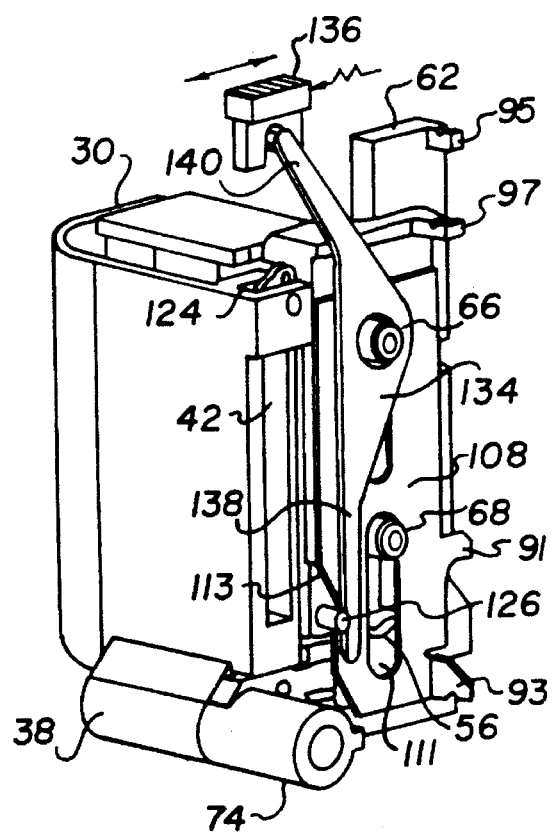

FIG. 14 depicts one manner in which a release lever 134 and a manual slidable latch 136 may be combined into the fixed component group 60 between the spring plate 108 and the camera frame 29 to apply the outward opening force to pin 126. The release lever 134 is pivotally mounted to the stud 66, and a first end 138 may be pivoted outward against the pin 126 as the second end 140 is moved rearward by manipulation of the slidable latch 136 against a spring bias force in a manner well known in the art.

The invention may be modified to operate with any particular cartridge configuration or design that may be developed. The component group 60 and wipe-by components 114–118 are illustrated as only one way of seating and ejecting filmstrip cartridge 10 and may be modified to operate with other film cartridge configurations that substitute other mechanisms for the elongated retention slot 20 without affecting the present invention.

It will also be understood that the filmstrip drive mechanism may be supported above the plate extension 59 with the drive spindle 45 extending through it in substitution for the B-point locator pin 48, and an A-point locator pin may be located in the seat end of the magazine 34 in substitution for the drive opening 37 shown in FIG. 4. The drive spindle 45 and an attached drive gear may be mounted to the upper surface of plate extension 59, and the drive gear mechanism may be engaged and disengaged by a filmstrip advance/rewind drive motor gear mechanism fixed to frame 29 by movement of B-plate 50 between the engaged and extended positions thereof, respectively, as described above.

Although the present invention has been described in the context of the preferred embodiment of FIGS. 2–14, it will be understood that it may be applicable to any other deployable film loading chamber and cartridge configuration. The interlock mechanism involving sensing or contacting the filmstrip edge of a conventional edge configuration anywhere along the length of the filmstrip and outside the filmstrip image frame can be implemented in end or side deployable film loading chambers to inhibit any opening motion sufficient to allow light entry. The specific advantageous features of the preferred embodiment in effecting alignment of the filmstrip cartridge and filmstrip to the filmstrip transport path are not necessary to the practice of the present invention. A variety of filmstrip edge sensors and interlock structures may also be substituted for the depicted structures.

While there has been shown what are considered to be the preferred embodiments of the invention, it will be manifest that many changes and modifications and substitutions of technically equivalent structure may be made therein without departing from the essential spirit of the invention. It is intended, therefore, in the following claims to cover all such changes and modifications as may fall within the true scope of the invention.

For example, rather than blocking the free end of the cocking lever 64 so that the user cannot deploy the film loading chamber 30 as described by the present embodiment when the filmstrip 128 is in the filmstrip transport path 35, the stoppage of the linkage movement can disconnect or disable the cocking lever 64 from the locking mechanism. In this manner, a full motion of the cocking lever 64 will not deploy the film loading chamber 30 when the filmstrip 128 has been sensed.

PARTS LIST FOR FIGS. 1–13 film cartridge 10
cartridge free end 11
cartridge seated end 12
cartridge snout 14
cartridge spool hub 16
film door 18
retention slot 20
door opening 24
rotatable door hub 26
camera body 28
camera frame 29
film loading chamber 30
vertical side wall 31
film supply cavity 32
guide rails 33, 33'
magazine 34
film transport path 35
door opening driver 36
drive shaft opening 37
hinged end 38
recess 39
filmstrip drive mechanism 40
filmstrip passage 42
cartridge door driver 44
hinge pin receptacle 46
B-point locator pin 48
B-plate 50
elongated slots 54, 56
vertical plate extension 55
shoulder 57
horizontal plate extension 59
component group 60
mounting plate 62
bias spring 63
cocking lever 64
mounting studs 66, 68
elongated slot 67
retaining slot 69
hinge pin 70
pin 71
hinge pin receptacle 72
tab 73
hinge pin receptacle 74
pin 75
tab 76
latch surface 77
D-point datum locator pin 78
cartridge door driver lever 80
guide pins 81, 83
spring 84
detent spring 86
ejector latch stud 88
ejector latch 90 tabs 91, 93, 95, 97
mounting plate 92
slide ejector 94
retaining plate 96
slide ejector stud 98
slide ejector spring 100
latch slot 102
horizontally extending lever arm 105
cartridge door driver lever actuator 106
vertical plate extension 107
spring plate 108
elongated openings 109, 111
spring plate spring 110
B-plate spring 112
sloped spring plate notch 113
wipe-by cam screw 114
wipe-by cam spring 116
wipe-by cam 118
B-plate trigger 120
cam end 121
film present interlock lever 122
interlock lever arm 123
axle end 124
film transport path lever arm 125
cocking lever pin 126
filmstrip 128
latch pin 130
rear cut-out 131
horizontally extending drive pin 132
release lever 134
manual slidable latch 136
first end 138
second end 140

What is claimed is:

1. A camera for receiving a photographic filmstrip cartridge, said camera comprising a frame having a film supply cavity and a filmstrip transport path, and a film loading chamber for receiving said film cartridge, said cartridge having a seated end and a free end with end openings through which a spool hub of a filmstrip spool is exposed, is characterized by:

deploying means for pivotally moving said film loading chamber between a deployed position for receiving said film cartridge, seated end first, into an end opening thereof and a closed position wherein the film loading chamber is pivoted into said film supply cavity to position said film cartridge in alignment with said filmstrip transport path, said deploying means including a pivotable lever movable with the film loading chamber between the closed position and the deployed position;

filmstrip drive means for advancing said filmstrip from said film cartridge into said filmstrip transport path when the film loading chamber is moved to the closed position; and interlock means for sensing the presence of said filmstrip in said filmstrip transport path for inhibiting deployment of said film loading chamber from the closed position to the deployed position by said deploying means when said filmstrip is in said film transport path, wherein said interlock means comprises an interlock lever having a first and second end and a pivotal mounting point positioned in relation to said filmstrip transport path for pivotal movement of said first end into said filmstrip transport path in the absence of a filmstrip therein, and said second end into an interfering engagement with said pivotable lever for inhibiting deployment of said film loading chamber to said deployed position.

2. The camera of claim 1, wherein said filmstrip drive means engages said filmstrip spool hub at a first end thereof when said loading chamber is moved to the closed position for advancing the filmstrip from said film cartridge into said filmstrip transport path, and into deflecting contact with said first end of said interlock lever to position said second end of said interlock lever into interfering engagement with said pivotable lever to prevent said pivotable lever from movement to the deployed position.

3. The camera of claim 2, further including latch means for latching said film loading chamber in said closed position upon pivotal movement of said film loading chamber into said film supply cavity; and means coupled with said latch means for engaging said filmstrip spool hub at the second end thereof to align said filmstrip with respect to said film transport path.

4. The camera of claim 1, wherein said first end of said interlock lever engages a side edge of said filmstrip outside the image frame area of the filmstrip.

5. The camera of claim 1, further including latch means for latching said film loading chamber in said closed position upon pivotal movement of said loading chamber into said film supply cavity; and means coupled with said latch means for engaging said filmstrip spool hub at the second end thereof to align said filmstrip with respect to said film transport path, wherein said filmstrip drive means engages said filmstrip spool hub at a first end thereof when said loading chamber is moved to said closed position for advancing the filmstrip from said film cartridge into said filmstrip transport path and into contact with said interlock means.

6. The camera of claim 5, wherein said film cartridge includes a cartridge door movable on a door hub between an open position for advancing filmstrip onto or from said filmstrip spool and a closed position for enclosing said filmstrip entirely within said cartridge, and said camera includes door drive means for engaging said door hub and for opening said cartridge door to allow said filmstrip advancing means to advance said filmstrip into said filmstrip transport path upon movement of said film loading chamber into said closed position by said deploying means, and to contact said interlock means.

7. The camera of claim 1, wherein said film cartridge includes a cartridge door movable on a door hub between an open position for advancing filmstrip onto or from said filmstrip spool and a closed position for enclosing said filmstrip entirely within said cartridge; and said camera includes door drive means for engaging said door hub and for opening said cartridge door to allow said filmstrip advancing means to advance said filmstrip into said filmstrip transport path upon movement of said film loading chamber into said closed position by said deploying means, and to contact said interlock means.

8. The camera of claim 1, wherein said first end of said interlock lever engages a side edge of said filmstrip outside the image frame area of the filmstrip.

9. A camera having a film transport path and a film supply cavity in a camera frame for receiving a photographic filmstrip cartridge having a filmstrip wound around a filmstrip spool within a cartridge housing, said cartridge housing having a seated end and a free end with end openings through which the spool hub of said filmstrip spool is exposed, a film door covering a door opening extending between said seated and free ends and pivotal on a door opening hub between a door open and a door closed position, is characterized by:

said camera having a film cartridge loading chamber for receiving said filmstrip through an open end thereof;

deploying means for pivotally moving said film loading chamber between a deployed position for receiving said film cartridge extending said chamber open end out of said film transport path and a closed position wherein the film loading chamber is pivoted into said film supply cavity to position said film cartridge in alignment with said filmstrip transport path;

latch means for latching said film loading chamber in said closed position upon pivotal movement of said loading chamber into said film supply cavity and for engaging said filmstrip cartridge, said deploying means including a pivotable lever movable between the closed position and the deployed position to allow the film loading chamber to be pivotally moved between the closed and the opened positions;

door drive means for engaging said door hub and for opening said cartridge door to allow said filmstrip to be advanced into said filmstrip transport path upon movement of said film loading chamber into said closed position by said deploying means;

filmstrip drive means for advancing the filmstrip from said film cartridge into said filmstrip transport path when said loading chamber is moved to said closed position and latched; and interlock means for sensing the presence of said filmstrip in said filmstrip transport path for inhibiting release of said latch means and deployment of said film loading chamber from said closed position to said deployed position by said deploying means, wherein said interlock means includes a pivotable inkerlock lever having a first end and a second end, said first end being pivotally movable into the film transport path to detect the presence of a filmstrip wherein sensing of the filmstrip by said interlock lever moves the second end of said interlock lever into engagement with the pivotable lever of said latch means to prevent the pivotable lever to be moved to the deployed position, thereby preventing movement of the film loading chamber to the deployed position.

10. The camera of claim 9, wherein said latch means further comprises means coupled with said film loading chamber for providing a latch slot;

a movable plate attached for movement with respect to said camera frame from an extended position and a engaged position;

a latch pin mounted to extend from said movable plate and providing a reference point; and means for effecting movement of said movable plate between said extended and engaged positions for engaging said latch pin in said latch slot in said engaged position and for spacing said latch pin out of said latch slot in said extended position.

11. The camera of claim 10, wherein said filmstrip drive means engages said filmstrip spool hub at a first end thereof when said loading chamber is moved to said closed position for advancing the filmstrip from said film cartridge into said filmstrip transport path and into deflecting contact with said first end of said interlock lever to position said second end of said interlock lever into interfering engagement with said means for effecting movement for inhibiting movement of said movable plate from said engaged position to said extended position and deployment of said film loading chamber to said deployed position.

12. The camera of claim 11, wherein said filmstrip drive means engages said filmstrip spool hub at a first end thereof when said loading chamber is moved to said closed position for advancing the filmstrip from said film cartridge into said filmstrip transport path and into deflecting contact with said first end of said interlock lever to position said second end of said interlock lever into interfering engagement with said latch means and deployment of said film loading chamber to said deployed position.

13. The camera of claim 11, wherein said first end of said interlock lever engages a side edge of said filmstrip outside the image frame area of the filmstrip.

14. The camera of claim 10, wherein said interlock means engages a side edge of said filmstrip outside the image frame area of the filmstrip.

* * * * *

UNITED STATES PATENT AND TRADEMARK OFFICE
CERTIFICATE OF CORRECTION

PATENT NO. : 5,563,672
DATED : October 8, 1996
INVENTOR(S) : Timothy J. Fuss, et al It is certified that an error appears in the above-identified patent and that said Letters Patent is hereby corrected as shown below:

Column 17, Line 35 -- Delete "inkerlock" and insert --interlock-- --

Signed and Sealed this

Twenty-fifth Day of November, 1997

Attest:

BRUCE LEHMAN

Attesting Officer  Commissioner of Patents and Trademarks